United States Patent
Fu et al.

(10) Patent No.: US 11,193,755 B2
(45) Date of Patent: Dec. 7, 2021

(54) MEASUREMENT SYSTEM, MEASUREMENT DEVICE, MEASUREMENT METHOD, AND MEASUREMENT PROGRAM

(71) Applicant: OMRON Corporation, Kyoto (JP)

(72) Inventors: Xingdou Fu, Kizugawa (JP); Lin Miao, Higashiosaka (JP)

(73) Assignee: OMRON Corporation, Kyoto (JP)

( * ) Notice: Subject to any disclaimer, the term of this patent is extended or adjusted under 35 U.S.C. 154(b) by 23 days.

(21) Appl. No.: 15/930,473

(22) Filed: May 13, 2020

(65) Prior Publication Data

US 2020/0363186 A1 Nov. 19, 2020

(30) Foreign Application Priority Data

May 15, 2019 (JP) .............................. JP2019-091862

(51) Int. Cl.
  *G01B 11/00* (2006.01)
  *B25J 9/02* (2006.01)
(52) U.S. Cl.
  CPC ............. *G01B 11/005* (2013.01); *B25J 9/023* (2013.01)
(58) Field of Classification Search
  CPC .......... G02B 2027/0178; G02B 27/017; G02B 27/0093; G02B 2027/014; G02B 27/0172; G02B 2027/0187; G02B 2027/0138; G02B 2027/0118; G02B 13/22; G02B 5/30; G02B 27/0176; G02B 2027/0141; G02B 27/01; G02B 2027/0174; G02B 2027/0147;

(Continued)

(56) References Cited

U.S. PATENT DOCUMENTS 4,481,592 A * 11/1984 Jacobs .................. B25J 9/1692
  318/568.14
4,879,664 A * 11/1989 Suyama .................... G06T 7/73
  700/186

(Continued)

FOREIGN PATENT DOCUMENTS

CN 101261118 A 9/2008
CN 103302664 A 9/2013

(Continued)

OTHER PUBLICATIONS

An extended European search report (EESR) dated Oct. 6, 2020 in a counterpart European patent application.

(Continued)

*Primary Examiner* — Michael P Stafira
(74) *Attorney, Agent, or Firm* — Metrolex IP Law Group, PLLC

(57) ABSTRACT

Provided are a measurement system, a measurement device, a measurement method, and a measurement program. 3D data is registered to 3D data based on the displacements of joints of a robot at a point in time when a 3D sensor measures 3D data of a measurement object at a specific measurement point while the robot is stopped, and the displacements of the joints of the robot at a point in time when the 3D sensor measures 3D data of the measurement object at a measurement point other than the specific measurement point while that robot is in motion. The 3D data is further registered to the 3D data such that a registration error between the 3D data and the 3D data is less than a threshold value. Similarly, each of 3D data is registered to the 3D data.

19 Claims, 8 Drawing Sheets

(58) Field of Classification Search
CPC .... G02B 2027/0112; G02B 2027/0127; G02B 2027/0132; G02B 27/0149; G02B 5/18; G02B 6/12009; G02B 2027/011; G02B 2027/0123; G02B 2027/0134; G02B 2207/113; G02B 2207/115; G02B 26/10; G02B 27/0006; G02B 27/0101; G02B 5/23; G02B 5/3058; G02B 6/0038; G02B 6/0045; G02B 6/0053; G02B 6/0056; G02B 6/12019; G02B 7/008; G02B 27/0179; G02B 5/04; G02B 5/1842; G02B 5/28; G01B 11/2518; G01B 11/002; G01B 11/25; G01B 11/2513; G01B 11/005; G01B 21/042; G01B 11/2433; G01B 5/004; G01B 5/008; G01B 11/272; G01B 11/03; G01B 11/30; G01B 21/047; G01B 7/18; G01B 11/08; G01B 11/24; G01B 3/30; G01B 11/007; G01B 11/026; G01B 11/245; G01B 11/2545; G01B 11/26; G01B 15/00; G01B 2210/52; G01B 2210/54; G01B 5/0004; G01N 2021/845; G01N 21/8901; G01N 21/95607; G01N 21/9501; G01N 21/95684; G01N 2201/0635; G01N 21/89; G01N 2035/0491; G01N 35/0099; G01N 2035/00782; G01N 2035/0489; G01N 2035/0494; G01N 2035/00079; G01N 2035/00237; G01N 2035/00356; G01N 2035/00435; G01N 2035/0403; G01N 2035/0475; G01N 2035/1013; G01N 2035/102; G01N 2035/1034; G01N 2035/1058; G01N 2035/106; G01N 35/0098; G01N 35/02; G01N 35/028; G01N 35/1004; G01N 35/109; G01N 9/08

See application file for complete search history.

(56) References Cited

U.S. PATENT DOCUMENTS

| | | |
|---|---|---|
| 2004/0162700 A1 | 8/2004 | Rosenberg et al. |
| 2013/0238131 A1 | 9/2013 | Kondo et al. |
| 2015/0202777 A1 | 7/2015 | Kondo et al. |
| 2017/0072566 A1 | 3/2017 | Murata |
| 2017/0072569 A1 | 3/2017 | Kondo et al. |
| 2018/0050452 A1 | 2/2018 | Ou et al. |
| 2018/0194007 A1 | 7/2018 | Namiki et al. |
| 2018/0215045 A1 | 8/2018 | Kondo et al. |
| 2018/0222049 A1 | 8/2018 | Suzuki et al. |
| 2020/0061825 A1* | 2/2020 | Warashina ......... G05B 19/4086 |
| 2020/0096316 A1* | 3/2020 | Vinshtok ............ G01B 11/2545 |

FOREIGN PATENT DOCUMENTS

| | | |
|---|---|---|
| CN | 106514651 A | 3/2017 |
| CN | 107756423 A | 3/2018 |
| CN | 108297096 A | 7/2018 |

OTHER PUBLICATIONS

Bertram Drost et al., "Model globally, match locally: Efficient and robust 3D object recognition" Computer Vision and Pattern Recognition (CVPR), 2010, 2010 IEEE Conference on IEEEE, Concise explanation of relevance provided in the specification.

Richard A. Newcombe et al., "Kinectfusion: Real-time dense surface mapping and tracking" ISMAR, 2011, vol. 11, No. 2011, Concise explanation of relevance provided in the specification.

Paul J. Besl et al., "Method for registration of 3-D shapes" IEEE Transaction on Pattern Analysis and Machine Intelligence, Feb. 1992, vol. 12, No. 2, Concise explanation of relevance provided in the specification.

Office Action (CNOA) dated Aug. 3, 2021 in a counterpart Chinese patent application.

* cited by examiner

MEASUREMENT SYSTEM, MEASUREMENT DEVICE, MEASUREMENT METHOD, AND MEASUREMENT PROGRAM

CROSS-REFERENCES TO RELATED APPLICATIONS

This application claims priority to Japanese Patent Application No. 2019-091862 filed May 15, 2019, the entire contents of which are incorporated herein by reference.

FIELD

The disclosure relates to a measurement system, a measurement device, a measurement method, and a measurement program.

BACKGROUND

In the field of factory automation, a point cloud that indicates three-dimensional coordinates of points on the surface of a workpiece is measured using a distance sensor, and image processing for identifying or inspecting the workpiece from the point cloud obtained by the measurement is performed, for example.

Distance sensing used for this type of image processing is called "robot vision", and various methods are used for this measurement. For example, the measurement methods include a method in which the point cloud of a workpiece is measured from a fixed measurement point, a method in which the point cloud of a workpiece is measured while moving the measurement point, a method in which the point cloud of one workpiece is measured from one measurement point, and a method in which a plurality of point clouds are measured from a plurality of different measurement points with respect to one workpiece.

With the method in which the point cloud of a workpiece is measured from a fixed measurement point, and the method in which the point cloud of one workpiece is measured from one measurement point, there are cases where, depending on the workpiece, the workpiece cannot be identified with sufficient precision if the shape thereof is complex, or if the workpiece has been subjected to mirror finishing and the measurement is influenced by reflexion from a reflecting surface thereof. In contrast, as a result of measuring point clouds of a workpiece from a plurality of different measurement points, a plurality of different point clouds regarding different aspects of the workpiece can be measured, and therefore the workpiece can be identified with higher precision compared to the method in which the point cloud of a workpiece is measured from a fixed measurement point, and the method in which the point cloud of one workpiece is measured from one measurement point.

As this type of image processing, a model-base algorithm such as an algorithm described in Drost, Bertram et al., "Model globally, match locally: Efficient and robust 3D object recognition" Computer Vision and Pattern Recognition (CVPR), 2010 IEEE Conference on IEEEE, 2010 (NPTL 1) is known. This algorithm uses a feature amount called PPF (point pair feature) in which the relationship between positions and normal lines of a plurality of points is described, and can be applied to processing for estimating the position and orientation of an object, and registration processing of point clouds of an object. This feature amount is a four-dimensional feature amount that is calculated with respect to a combination of two points (point pair) selected from the point cloud of an object. The four dimensions are the distance between the two points, the angles formed by the line segment connecting the two points and the respective normal directions at the points, and the angle between the normal lines at the two points. A point number of the two points is stored in a hash table using the feature amount as a key. In the matching processing, an object is identified by obtaining a rigid body deformation parameter between point pairs after retrieving corresponding points from the hash table. After the matching processing, the rotation amount and the movement amount of a distance sensor between adjacent measurement points are calculated, and two point clouds that are measured at the adjacent measurement points are registered based on the calculation result.

Another model-base algorithm is described in Newcombe, Richard A., et al., "Kinectfusion: Real-time dense surface mapping and tracking" ISMAR Vol. 11, No. 2011, 2011 (NPTL 2). This algorithm is for estimating the position and orientation of a distance image sensor based on a distance image of the periphery of the distance image sensor obtained by measurement performed by the distance image sensor. In this algorithm, the rotation amount and the movement amount of the distance image sensor between adjacent measurement points are calculated, and the two distance images that are measured at the adjacent measurement points are registered based on the calculation result.

The registration performed using the algorithm described in NPTL 1 or 2 is coarse registration that is performed as preprocessing of fine registration.

A method in which ICP (iterative closest point) is used as an algorithm for minimizing the distances between corresponding points of a plurality of point clouds of an object is described in Besl, Paul J., and McKay, Neil D., "Method for registration of 3-D shapes" Sensor Fusion IV: Control Paradigms and Data Structures, Vol. 1611, International Society for Optics and Photonics, 1992 (NPTL 3). In the ICP, with respect to each point that constitutes one point cloud, a closest point in the other point cloud is searched, and assumed to be a provisional corresponding point. A rigid body transformation for minimizing the distances between such corresponding points is estimated, and the distances between corresponding points of the point clouds are minimized by repeating the searching of the corresponding points and the estimation of the rigid body transformation. The ICP is fine registration performed as postprocessing of the coarse registration.

SUMMARY

However, the registration algorithms described in NPTLs 1 and 2 require a large amount of calculations for performing image processing, and the robustness thereof is low. Also, in the ICP described in NPTL3, if the shift between point clouds in the initial state is large, there may be cases where the searching of corresponding points and the estimation of rigid body transformation are repeated many times, or the registration fails. These known techniques are not practically sufficient in the field of factory automation where productivity is needed, because the calculation time may be lengthy.

Therefore, one or more aspects aim to provide a measurement system, a measurement device, a measurement method, and a measurement program for reducing the time required to perform registration of 3D data of a measurement object.

In order to solve the above-mentioned problem, a measurement system according to one or more aspects includes: a 3D sensor that is to be installed in a robot, and is configured to measure 3D data indicating three-dimensional coordinates of points on the surface of a measurement object; a displacement detection device configured to detect displacements of joints of the robot; a drive device configured to drive the joints of the robot so as to change positional relationship of the 3D sensor relative to the measurement object; a sensor control unit configured to control the 3D sensor so as to measure 3D data of the measurement object at a plurality of measurement points at which positional relationships of the 3D sensor relative to the measurement object are different; a synchronization control unit configured to match the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points; a first registration processing unit configured to register the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and a second registration processing unit configured to register the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value. According to the configuration described above, the time needed to perform registration of the 3D data of the measurement object can be reduced.

At the specific measurement point, the robot is stopped its motion, and therefore, even if the timing at which the 3D sensor measures 3D data of the measurement object is not synchronized with the timing at which the displacement detection device detects displacements of the joints of the robot, the position and posture of the robot when the 3D sensor measures the 3D data of the measurement object matches the position and posture of the robot when the displacement detection device detects the displacements of the joints of the robot. Therefore, the timing at which the 3D sensor measures 3D data of the measurement object at a measurement point other than the specific measurement point need not be synchronized with the timing at which the displacement detection device detects displacements of the joints of the robot. The robot need not stop its motion at a measurement point other than the specific measurement point in order to match the position and posture of the robot when the 3D sensor measures 3D data of the measurement object with the position and posture of the robot when the displacement detection device detects displacements of the joints of the robot, and therefore the time needed to perform registration of the 3D data of the measurement object can be reduced.

The number of times the synchronization control unit causes the robot to stop its motion may be less than the number of the plurality of measurement points. With this, the number of times the robot is caused to stop its motion in order to match the position and posture of the robot when the 3D sensor measures 3D data of the measurement object with the position and posture of the robot when the displacement detection device detects displacements of the joints of the robot may be less than the number of the plurality of measurement points, and therefore the time needed to perform registration of the 3D data of the measurement object can be reduced.

The specific measurement point may be one measurement point of the plurality of measurement points. With this, the number of times the robot is caused to stop its motion in order to match the position and posture of the robot when the 3D sensor measures 3D data of the measurement object with the position and posture of the robot when the displacement detection device detects displacements of the joints of the robot need only be one, and therefore the time needed to perform registration of the 3D data of the measurement object can be reduced.

The measurement system according to one or more aspects may further include: a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and a position/orientation estimation unit configured to estimate the position and orientation of the measurement object relative to the robot based on 3D data subjected to coordinate-transformation by the coordinate transformation unit. As a result of using the 3D data obtained through registration performed by the first registration processing unit and the second registration processing unit, the time needed to estimate the position and orientation of the measurement object relative to the robot can be reduced.

A measurement device according to one or more aspects is a measurement device that receives information indicating displacements that is output from a displacement detection device configured to detect displacements of joints of a robot, and outputs a drive instruction to a drive device configured to drive the joints of the robot. The measurement device includes: a 3D sensor that is to be installed in the robot, and is configured to measure 3D data indicating three-dimensional coordinates of points on the surface of a measurement object; a drive control unit configured to generate a drive instruction for driving the joints of the robot so as to change positional relationship of the 3D sensor relative to the measurement object; a sensor control unit configured to control the 3D sensor so as to measure 3D data of the measurement object at a plurality of measurement points at which positional relationships of the 3D sensor relative to the measurement object are different; a synchronization control unit configured to match the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points; a first registration processing unit configured to register the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and a second registration processing unit configured to register the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value. According to the configuration described above, the time needed to perform registration of the 3D data of the measurement object can be reduced.

A measurement method according to one or more aspects is, when executed, for causing a measurement device that includes a 3D sensor that is to be installed in a robot and is configured to measure 3D data indicating three-dimensional coordinates of points on the surface of a measurement object, receives information indicating displacements that is output from a displacement detection device configured to detect displacements of joints of the robot, and outputs a drive instruction to a drive device configured to drive the joints of the robot to execute: generating a drive instruction for driving the joints of the robot so as to change positional relationship of the 3D sensor relative to the measurement object; controlling the 3D sensor so as to measure 3D data of the measurement object at a plurality of measurement points at which positional relationships of the 3D sensor relative to the measurement object are different; matching the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points; registering the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and registering the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value. According to this method, the time needed to perform registration of the 3D data of the measurement object can be reduced.

A measurement program according to one or more aspects is, when executed, for causing a measurement device that includes a 3D sensor that is to be installed in a robot, and is configured to measure 3D data indicating three-dimensional coordinates of points on the surface of a measurement object, receives information indicating displacements that is output from a displacement detection device configured to detect displacements of joints of the robot, and outputs a drive instruction to a drive device configured to drive the joints of the robot to execute: generating a drive instruction for driving the joints of the robot so as to change positional relationship of the 3D sensor relative to the measurement object; controlling the 3D sensor so as to measure 3D data of the measurement object at a plurality of measurement points at which positional relationships of the 3D sensor relative to the measurement object are different; matching the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points; registering the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and registering the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value. According to this method, the time needed to perform registration of the 3D data of the measurement object can be reduced.

According to one or more aspects, the time required to perform registration of the 3D data of a measurement object can be reduced.

DETAILED DESCRIPTION

Hereinafter, an embodiment according to one or more aspects will be described based on the drawings. One or more embodiments are described herein for the purpose of facilitating understanding of the present invention, and are not to be interpreted as limiting the present invention. Disclosed embodiments can be modified or improved without departing from the spirit of the invention, and include equivalents thereof. Note that the same reference signs indicate the same constituent elements, and a description thereof may not be repeated.

Application Example

Figure 1:
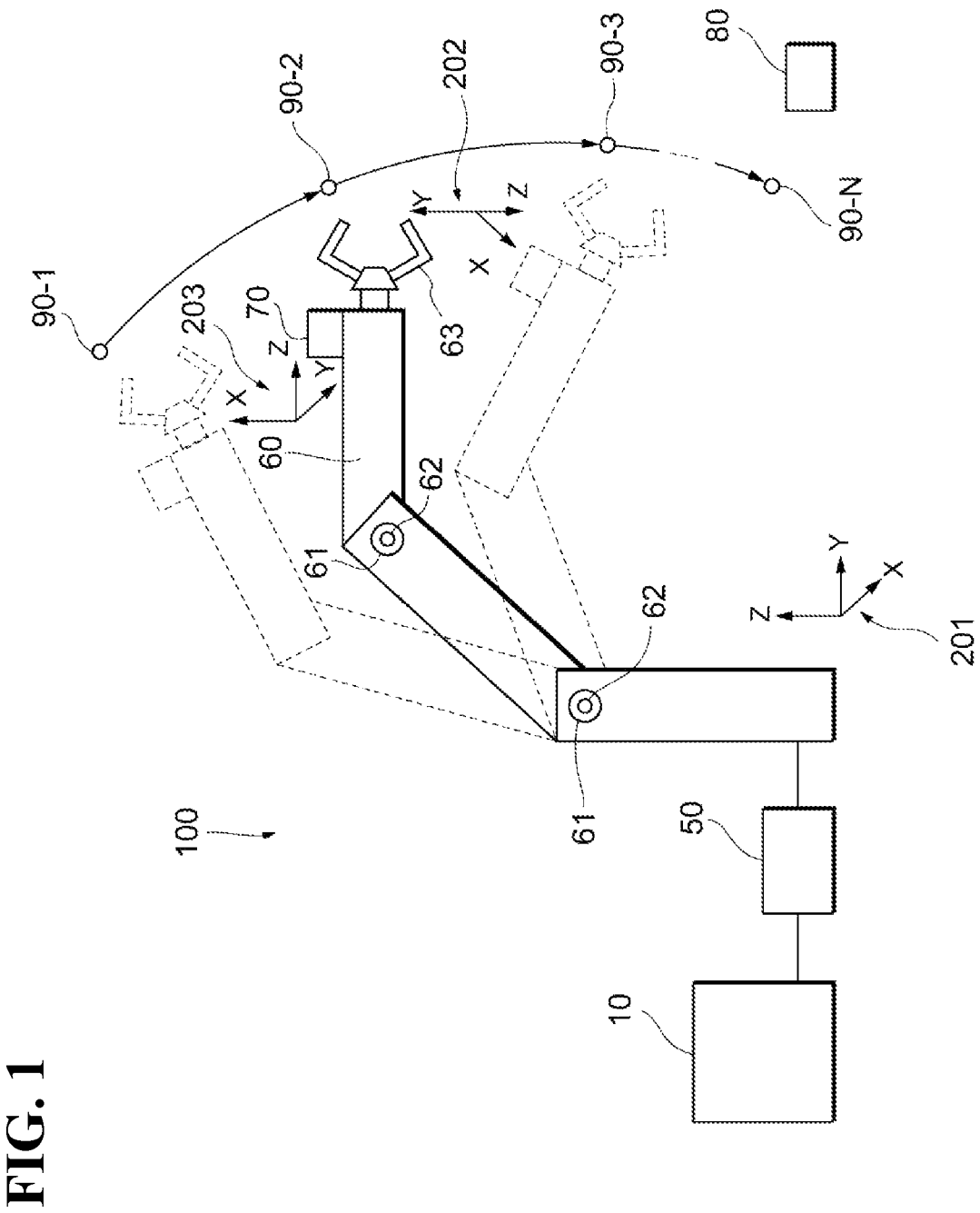
FIG. 1 is a diagram illustrating an example of a schematic configuration of a measurement system according to an embodiment.

FIG. 1 is a diagram illustrating an example of a schematic configuration of a measurement system 100 according to an embodiment or embodiments. The measurement system 100 includes a robot 60, a 3D sensor 70 installed in the robot 60, a computer system 10 that controls driving of the robot 60 and measurement of 3D data of a measurement object 80 by the 3D sensor 70, and a robot controller 50 that controls the motion of the robot 60 in response to an instruction from the computer system 10.

The 3D data indicates three-dimensional coordinates of points on the surface of the measurement object 80. A point cloud or a distance image can be used as this type of 3D data, for example. A point cloud is defined as a set of points having three-dimensional coordinate values (x, y, z) in an xyz orthogonal coordinate system, for example. A distance image is defined as a set of pixels whose pixel values indicate distances d corresponding to two-dimensional image coordinates (u, v) in a uv orthogonal coordinate system, for example. Here, d is the distance between the 3D sensor 70 and the measurement object 80.

The 3D sensor 70 may be a distance sensor that measures a point cloud, or a distance image sensor for acquiring a distance image in which a distance sensor and a 2D sensor are combined. The distance sensor is a sensor that measures the distance d as depth information. A trigonometry method, a time-of-flight method, a phase difference method, or the like can be used as its measurement method. The 2D sensor is an image sensor that shoots a two-dimensional image. The two-dimensional image differs from the distance image in that its pixel value does not indicate the distance d. The distance image sensor may be a camera that acquires a distance image whose pixel values indicate distances d by shooting a plurality of two-dimensional images of the measurement object 80 while changing the shooting position of the 2D sensor and performing stereoscopic image processing, for example. Alternatively, the distance image sensor may also be a stereo camera that acquires a distance image whose pixel values indicate distances d by shooting the measurement object 80 from a plurality of different directions at the same time.

The robot 60 is an articulated robot (e.g., vertical articulated robot, horizontal articulated robot) that includes a robot hand 63 for manipulating (e.g., holding, sucking, moving, assembling, or inserting) the measurement object 80, for example. The robot 60 includes drive devices 61 for driving the joints and displacement detection devices 62 for detecting the displacements (angle displacements) of the joints. Each drive device 61 is a servomotor for performing driving in response to a drive instruction from the robot controller 50, for example. Each displacement detection device 62 is an encoder (e.g., incremental encoder or absolute encoder) for detecting the rotation angle of the servomotor, for example. The drive device 61 and the displacement detection device 62 are incorporated in each joint of the robot 60.

The robot 60 functions as a manipulator that autonomously operates, and can be used for various applications such as picking, assembling, conveying, coating, inspecting, polishing, or cleaning the measurement object 80, for example. The measurement object 80 is a workpiece such as a work in progress or a component, for example. Examples of the workpiece include a machine component in a power train system (e.g., engine or transmission) of an automobile, and an electronic component in an electrical system.

The measurement system 100 controls driving of the joints of the robot 60 such that the positional relationship of the 3D sensor 70 relative to the measurement object 80 is changed. Also, the measurement system 100 measures the 3D data of the measurement object 80 at a plurality of measurement points 90-1, 90-2, 90-3, . . . , and 90-N at which the positional relationships of the 3D sensor 70 relative to the measurement object 80 are different, and also detects the displacements of the joints of the robot 60 at points in time at which respective 3D data have been measured. Here, N is an integer of two or more.

The measurement system 100 matches the position and posture of the robot 60 when the 3D sensor 70 measures 3D data of the measurement object 80 with the position and posture of the robot 60 when the displacement detection device 62 detects displacements of the joints of the robot 60 by causing the robot 60 to stop its motion at a specific measurement point of the plurality of measurement points 90-1, 90-2, 90-3, . . . , 90-N. At the specific measurement point, the measurement system 100 measures 3D data of the measurement object 80 while the robot 60 is stopped, and detects the displacements of the joints of the robot 60 at points in time at which the respective 3D data have been measured. At the specific measurement point, even if the timing at which the 3D sensor 70 measures 3D data of the measurement object 80 is not synchronized with the timing at which the displacement detection device 62 detects the displacements of the joints of the robot 60, since the motion of the robot 60 is stopped, the position and posture of the robot 60 when the 3D sensor 70 measures 3D data of the measurement object 80 matches the position and posture of the robot 60 when the displacement detection device 62 detects displacements of the joints of the robot 60. At each measurement point other than the specific measurement point, the measurement system 100 measures 3D data of the measurement object 80 while the robot 60 is in motion, and also detects displacements of the joints of the robot 60 at a point in time at which the 3D data is measured. At each measurement point other than the specific measurement point, since the robot 60 is in motion, the timing at which the 3D sensor 70 measures 3D data of the measurement object 80 is not necessarily synchronized with the timing at which the displacement detection device 62 detects displacements of the joints of the robot 60, and therefore the position and posture of the robot 60 when the 3D sensor 70 measures 3D data of the measurement object 80 does not necessarily match the position and posture of the robot 60 when the displacement detection device 62 detects displacements of the joints of the robot 60.

The number of specific measurement points at which the robot 60 is caused to stop its motion needs only be a positive number of one or more and N−1 or less. In the following description, a case where the measurement point 90-1 is the specific measurement point will be illustrated in order to simplify the description. In this case, the position and posture of the robot 60 when the 3D sensor 70 measures 3D data of the measurement object 80 at the measurement point 90-1 while the robot 60 is stopped matches the position and posture of the robot 60 when the displacement detection device 62 detects displacements of the joints of the robot 60. On the other hand, at each of the measurement points 90-2, 90-3, . . . , and 90-N while the robot 60 is in motion, the position and posture of the robot 60 when the 3D sensor 70 measures 3D data of the measurement object 80 does not necessarily match the position and posture of the robot 60 when the displacement detection device 62 detects displacements of the joints of the robot 60.

Note that, in FIG. 1, reference sign 201 indicates a coordinate system based on the robot 60, reference sign 202 indicates a coordinate system based on the robot hand 63, and reference sign 203 indicates a coordinate system based on the 3D sensor 70. The coordinate systems 201, 202, and 203 are respectively referred to as a robot coordinate system, a tool coordinate system, and a sensor coordinate system.

Figure 2:
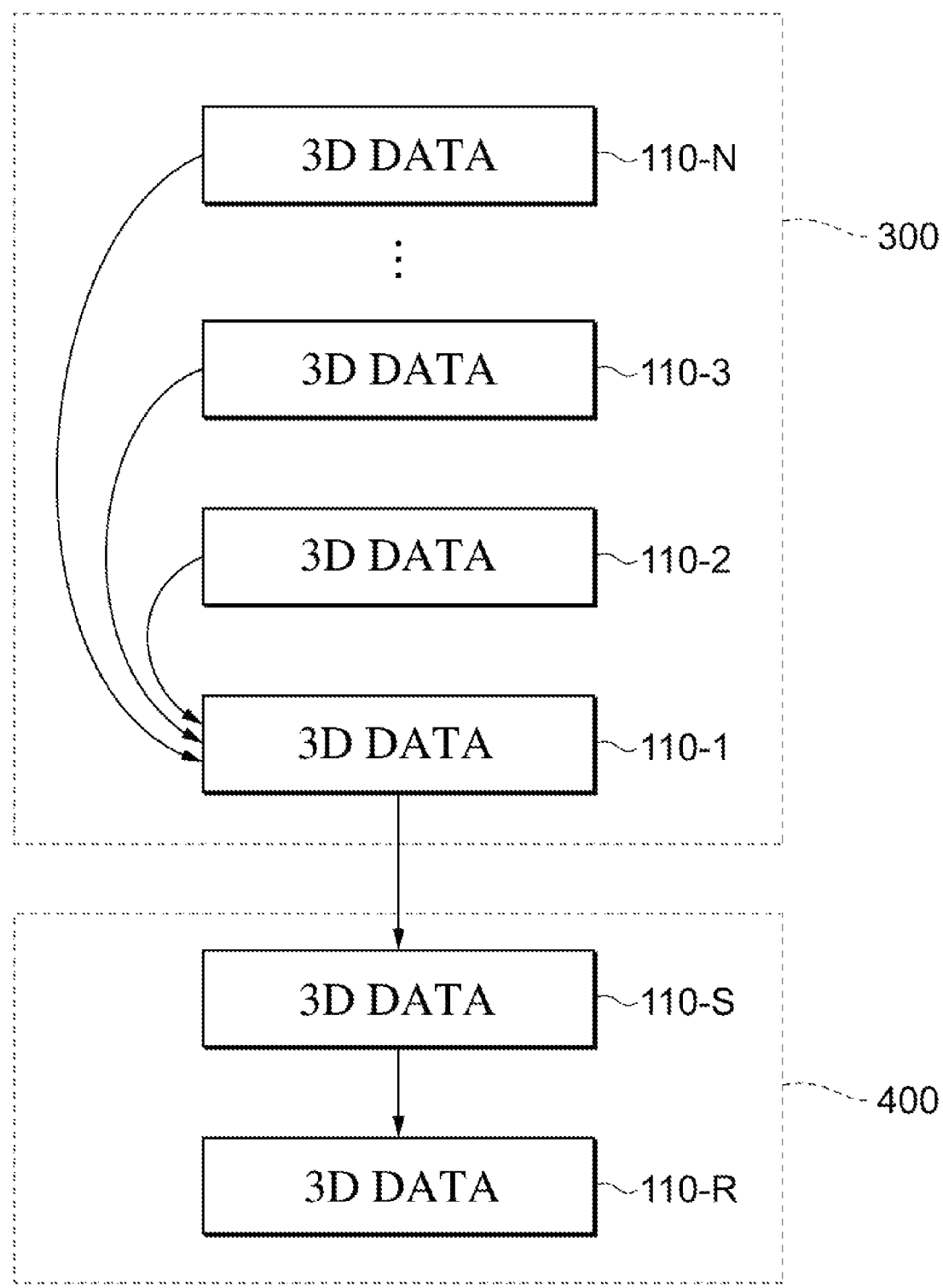
FIG. 2 is a diagram illustrating an example of a flow of processing 3D data according to an embodiment or embodiments.

FIG. 2 is a diagram illustrating an example of a flow of processing 3D data according to an embodiment or embodiments. The processing of 3D data includes registration processing 300 and coordinate transformation processing 400. Reference sign 110-1 indicates 3D data of the measurement object 80 that is measured at the specific measurement point 90-1 while the robot 60 is stopped. Reference signs 110-2, 110-3, . . . , and 110-N respectively indicate pieces of 3D data of the measurement object 80 at the measurement points 90-2, 90-3, . . . , and 90-N while the robot 60 is in motion.

At the specific measurement point 90-1, since the position and posture of the robot 60 when the 3D sensor 70 measures the 3D data 110-1 of the measurement object 80 matches the position and posture of the robot 60 when the displacement detection device 62 detects the displacements of the joints of the robot 60, the precise position and posture of the robot 60 at a point in time when the 3D data 110-1 is measured can be obtained by calculation from the displacements of the joints that are detected by the displacement detection device 62 at that point in time. On the other hand, at the measurement points 90-2, 90-3, . . . , and 90-N, the position and posture of the robot 60 when the 3D sensor 70 measures the respective pieces of 3D data 110-2, 110-3, . . . , and 110-N of the measurement object 80 does not necessarily match the position and posture of the robot 60 when the displacement detection device 62 detects the displacements of the joints of the robot 60, but the approximate position and posture of the robot 60 at each of points in time when the 3D data 110-2, 110-3, . . . , and 110-N are measured can be obtained by calculation from the displacements of the joints that are detected by the displacement detection device 62 at the respective points in time.

Here, the positional relationship of the 3D sensor 70 relative to the robot 60 is fixed and known, and therefore the change in the positional relationship of the 3D sensor 70 relative to the measurement object 80 can be obtained by calculation from the change in the positional relationship of the robot 60 relative to the measurement object 80. For example, focusing on the 3D data 110-1 measured at the measurement point 90-1 while the robot 60 is stopped and the 3D data 110-2 measured at the measurement point 90-2 while the robot 60 is in motion, the approximate change in the positional relationship of the 3D sensor 70 relative to the measurement object 80 between the two measurement points 90-1 and 90-2 can be obtained by calculation from the change between displacements of each joint (change in the position and posture of the robot 60) that are detected by the displacement detection device 62 at the points in time when the pieces of 3D data 110-1 and 1102 are measured. The measurement system 100 registers the 3D data 110-2 to the 3D data 110-1 based on the approximate change in the relative positional relationship between two measurement points 90-1 and 90-2 that can be obtained by calculation.

"Registration" means coordinate-transformation in order to match the position and posture for one 3D data point to the position and posture for another 3D data point. At the measurement point 90-2, the position and posture of the robot 60 when the 3D sensor 70 measures the 3D data 110-2 of the measurement object 80 does not necessarily match the position and posture of the robot 60 when the displacement detection device 62 detects the displacements of the joints of the robot 60, and therefore, if the 3D data 110-2 is registered to the 3D data 110-1 based on the displacements of the joints that are detected by the displacement detection device 62 at the points in time when the 3D data 110-1 and 110-2 are respectively measured, a registration error may occur. Therefore, the measurement system 100 registers the 3D data 110-2 to the 3D data 110-1 using an algorithm such as ICP (iterative closest point) such that the registration error between the 3D data 110-1 and 110-2 is less than a threshold value. In this way, even if a registration error occurs due to an error between the change in the relative positional relationship between the measurement points 90-1 and 90-2, which is estimated from the change in displacement of each joint that is detected by the displacement detection device 62 between the points in time when the 3D data 110-1 and 110-2 are respectively measured, and the actual change in the relative positional relationship between the measurement points 90-1 and 90-2, this registration error can be reduced to less than the threshold value using an algorithm such as ICP. Therefore, as a result of performing coarse registration based on the displacements of the joints detected by the displacement detection device 62 at the points in time when the 3D data 110-1 and 110-2 are respectively measured as preprocessing of fine registration using an algorithm such as ICP, the entire processing time needed to perform registration can be reduced.

Through the processing described above, the measurement system 100 registers the 3D data 110-2 to the 3D data 110-1. Similarly, the measurement system 100 registers each of the 3D data 110-3, 110-4, . . . , and 110-N to the 3D data 110-1. When the number of the specific measurement points is one, the registration processing 300 is processing for registering each of the (N−1) 3D data 110-2, 110-3, . . . , and 110-N to the 3D data 110-1. Reference sign 110-S indicates 3D data obtained through the registration processing 300.

The 3D data 110-S is 3D data of the measurement object 80 in the sensor coordinate system 203.

The measurement system 100 can transform the 3D data 110-S of the measurement object 80 in the sensor coordinate system 203 to 3D data of the measurement object 80 in the tool coordinate system 202, robot coordinate system 201, or the other coordinate system using a known transformation matrix. The coordinate transformation processing 400 is processing for coordinate-transforming the 3D data 110-S of the measurement object 80 in the sensor coordinate system 203 to that in a specific coordinate system (tool coordinate system 202, robot coordinate system 203, or another coordinate system). Reference sign 110-R indicates 3D data of the measurement object 80 in the robot coordinate system 201, and in the example shown in FIG. 2, the 3D data 110-S of the measurement object 80 in the sensor coordinate system 203 is transformed to the 3D data 110-R of the measurement object 80 in the robot coordinate system 201 through the coordinate transformation processing 400.

The measurement system 100 can obtain the motion target for the robot 60 to manipulate the measurement object 80 by calculating the position and orientation of the measurement object 80 relative to the robot 60 based on the 3D data 110-R of the measurement object 80 in the robot coordinate system 201. For example, in a manipulation for the robot 60 to hold the measurement object 80, the motion target of the robot 60 is the target position and target posture of the robot 60 needed for the robot hand 63 to hold the measurement object 80.

Note that the processing of 3D data of the measurement object 80 does not necessarily include the coordinate transformation processing 400, and may include processing in accordance with the purpose of the measurement system 100 in place of the coordinate transformation processing 400.

Also, in the above-description, an example in which the measurement point 90-1 is the specific measurement point has been described in order to simplify the description, but two measurement points 90-1 and 90-3 may be set as the specific measurement points, for example. In this case, processing for registering the 3D data 110-4 to the 3D data 110-3 and registering the resulting 3D data to the 3D data 110-1 may be used in place of the processing for registering the 3D data 110-4 to the 3D data 110-1. In this way, the 3D data measured at a measurement point other than the specific measurement points while the robot 60 is in motion may be registered to 3D data measured at one specific measurement point while the robot 60 is stopped, and the resulting 3D data may further be registered to 3D data measured at the other specific measurement point while the robot 60 is stopped.

Figure 3A:
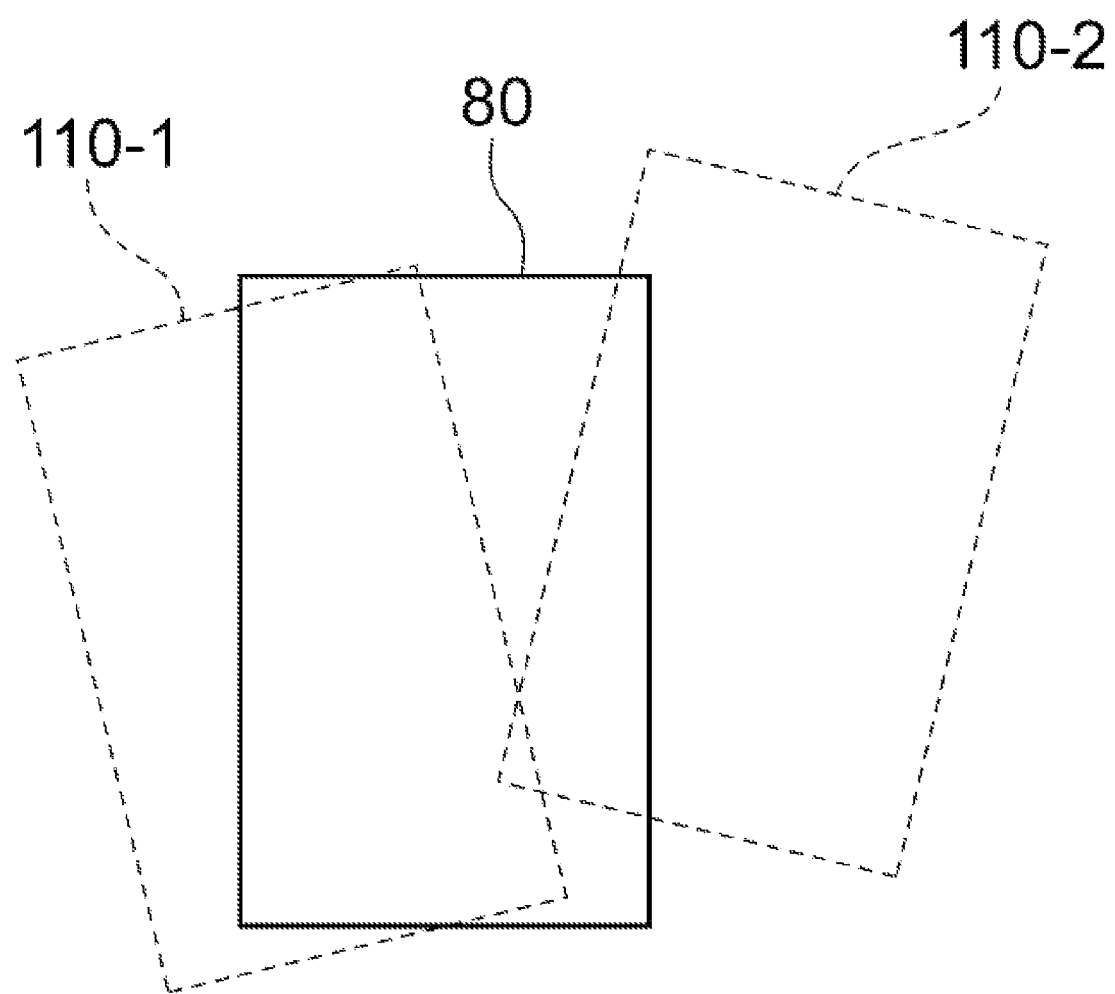
FIGS. 3A to 3C are diagrams illustrating an example of registration processing according to an embodiment or embodiments.
Figure 3B:
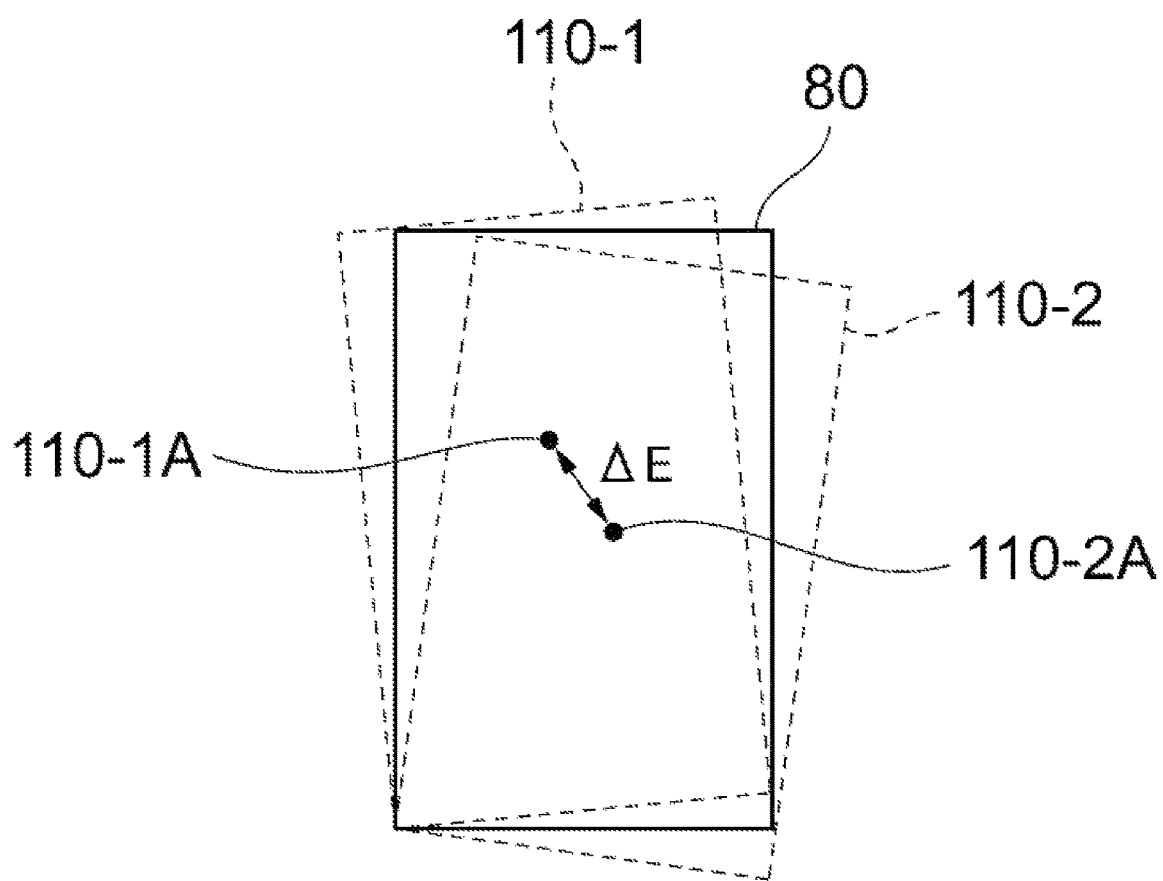
Figure 3C:
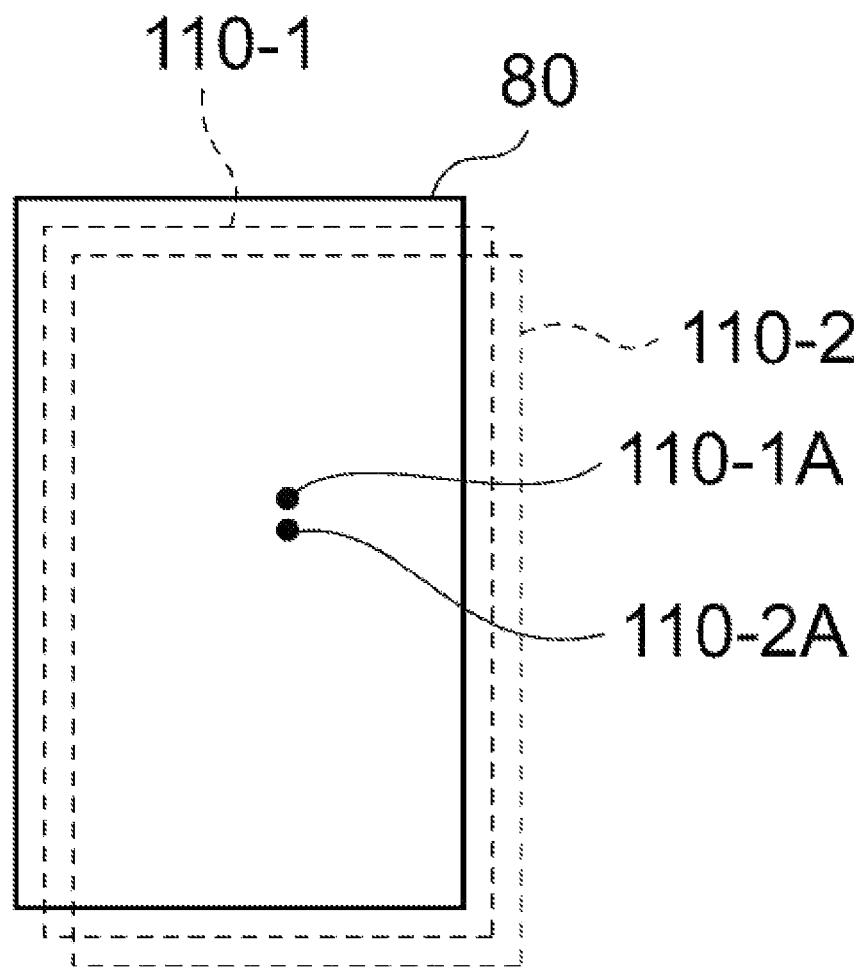

FIGS. 3A to 3C are diagrams illustrating an example of the registration processing 300 according to an embodiment or embodiments. In FIG. 3A, reference sign 110-1 indicates the 3D data of the measurement object 80 measured at the specific measurement point 90-1 while the robot 60 is stopped. Reference sign 110-2 indicates the 3D data of the measurement object 80 measured at the measurement point 90-2 while the robot 60 is in motion.

As shown in FIG. 3B, processing for registering the 3D data 110-2 to the 3D data 110-1 is performed based on the displacements of the joints detected by the displacement detection device 62 at the points in time when the 3D data 110-1 and 110-2 are respectively measured. Reference sign 110-1A indicates a certain point in the 3D data 110-1, and reference sign 110-2A indicates the point in the 3D data 110-2 corresponding to the point 110-1A. The two points 110-1A and 110-2A are in a corresponding relationship, and therefore these points are referred to as "corresponding points". The distance $\Delta E$ between the corresponding points 110-1A and 110-2A corresponds to a registration error.

As shown in FIG. 3C, processing for registering the 3D data 110-2 to the 3D data 110-1 is performed such that the registration error $\Delta E$ is less than the threshold value using an algorithm such as ICP. The threshold value needs only be a value with which practically sufficient precision of the registration processing 300 can be obtained. It is believed that the registration error $\Delta E$ between the 3D data 110-1 and 110-2 is smaller than the registration error when it is assumed that no alignment is performed, and therefore the number of times of processing for searching the corresponding points 110-1A and 110-2A and estimating rigid body transformation by ICP can be reduced, and as a result, the time needed for the registration processing can be reduced.

The registration algorithm described in NPTLs 1 and 2 requires a large amount of calculation for image processing, and therefore the calculation time may increase. In contrast, with the registration processing 300 according to an embodiment or embodiments, because the amount of calculation needed for image processing is small, the calculation can be ended in a short period of time. Also, with the ICP described in NPTL 3, if the error between 3D data in an initial state is large, searching the corresponding points and estimating the rigid body transformation are repeated many times, and therefore the calculation time may increase, or the registration may fail. In contrast, with the registration processing 300 according to an embodiment or embodiments, the number of times of processing for searching the corresponding points and estimating the rigid body transformation by ICP can be reduced, and calculation can be ended in a short period of time. Also, the robustness of registration can be improved.

With the reasons described above, the registration processing 300 according to an embodiment or embodiments is useful, in a field of factory automation where high productivity is required.

Hardware Configuration

Next, an example of a hardware configuration of the measurement system 100 and the measurement device 200 according to an embodiment or embodiments will be described with reference to FIG. 4.

The measurement device 200 includes the computer system 10 and the 3D sensor 70. The measurement system 100 includes the measurement device 200, the robot 60, and the robot controller 50. The computer system 10 includes a computation device 20, a storage device 30, and an input/output interface 40. The computation device 20 includes a CPU (central processing unit) 21, a ROM (read only memory) 22, and a RAM (random access memory) 23.

The storage device 30 is a computer readable recording medium such as a disk medium (e.g., magnetic recording medium or magneto-optical recording medium), or a semiconductor memory (e.g., volatile memory or nonvolatile memory). Such a recording medium may also be referred to as a non-transient recording medium, for example. The storage device 30 stores a measurement program 31 for executing the measurement method according to an embodiment or embodiments. The measurement program 31 is read into the RAM 23 from the storage device 30, and is interpreted and executed by the CPU 21. The measurement program 31 may also function as a main program for controlling the motion of the robot 60.

The computation device 20 receives information indicating the displacements of the joints of the robot 60 that is output from the displacement detection device 62, and outputs a drive instruction to the drive device 61 that drives the joints of the robot 60, via the input/output interface 40.

The robot controller 50 controls the driving of the drive device 61 (e.g., number of rotations and rotational torques of servomotors) that drives the joints of the robot 60 in response to the drive instruction output from the computation device 20 via the input/output interface 40.

The 3D sensor 70 measures 3D data of the measurement object 80 in response to a measurement instruction output from the computation device 20 via the input/output interface 40.

The computation device 20 receives 3D data of the measurement object 80 measured by the 3D sensor 70 and information indicating the displacements of the joints of the robot 60 that is output from the displacement detection device 62, and outputs the measurement instruction for instructing measurement of 3D data of the measurement object 80 by the 3D sensor 70 and the drive instruction for controlling driving of the drive device 61, via the input/output interface 40. Here, the RAM 23 temporarily stores 3D data of the measurement object 80 measured by the 3D sensor 70 and information indicating the displacements of the joints of the robot 60 that is output from the displacement detection device 62, and functions as a work area for the computation device 20 to perform the registration processing 300.

Figure 4:
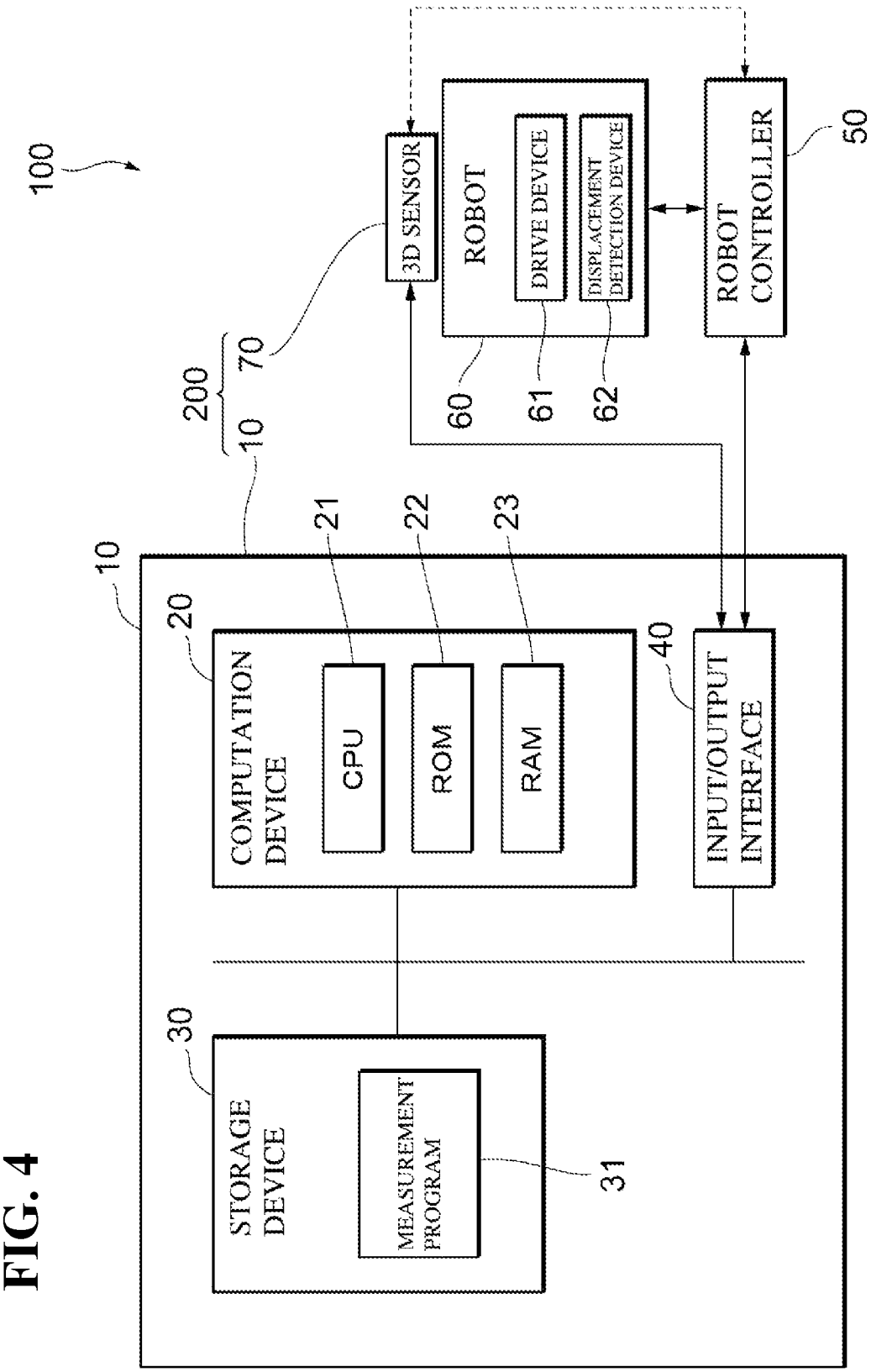
FIG. 4 is a diagram illustrating an example of a hardware configuration of a measurement system and a measurement device according to an embodiment or embodiments.

Note that, in FIG. 4, an example in which one each of the drive device 61 and the displacement detection device 62 is illustrated, but the number of drive device 61 and displacement detection device 62 may be the same as the number of joints.

Functional Configuration

Figure 5:
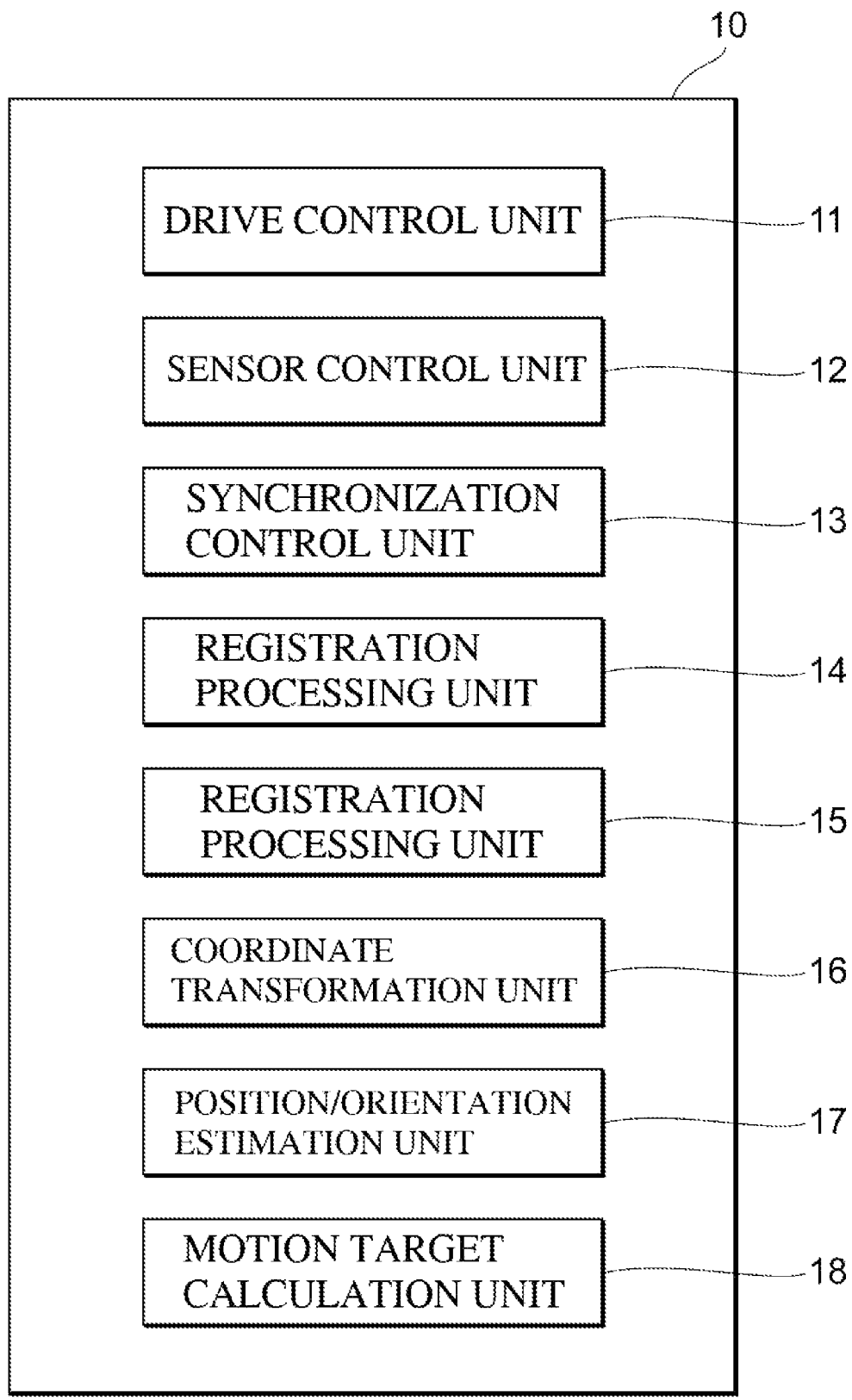
FIG. 5 is a block diagram illustrating an example of functions of a computer system according to an embodiment or embodiments.

FIG. 5 is a block diagram illustrating an example of functions of the computer system 10 according to an embodiment or embodiments. As a result of the hardware resources of the computer system 10 working together with the measurement program 31, the functions as a drive control unit 11, a sensor control unit 12, a synchronization control unit 13, a registration processing unit 14, a registration processing unit 15, a coordinate transformation unit 16, a position/orientation estimation unit 17, and a motion target calculation unit 18 are realized.

The drive control unit 11 generates drive instructions for driving the joints of the robot 60 so as to change the positional relationship of the 3D sensor 70 relative to the measurement object 80.

The sensor control unit 12 controls the 3D sensor 70 so as to measure 3D data of the measurement object 80 at the plurality of measurement points 90-1, 90-2, ..., and 90-N at which the positional relationships of the 3D sensor 70 relative to the measurement object 80 are different.

The synchronization control unit 13, by causing the robot 60 to stop its motion at a specific measurement point, of the plurality of measurement points 90-1, 90-2, ..., and 90-N, matches the position and posture of the robot 60 when the 3D sensor 70 measures 3D data of the measurement object 80 with the position and posture of the robot 60 when the displacement detection device 62 detects the displacements of the joints of the robot 60. The position and posture of the robot 60 when the 3D sensor 70 measures 3D data of the measurement object 80 at at least one measurement point other than the specific measurement point may match or not match the position and posture of the robot 60 when the displacement detection device 62 detects the displacements of the joints of the robot 60. The robot 60 need not stop its motion, other than the specific measurement point, in order to match the position and posture of the robot 60 when the 3D sensor 70 measures 3D data of the measurement object 80 with the position and posture of the robot 60 when the displacement detection device 62 detects the displacements of the joints of the robot 60, and therefore the time needed to perform registration of the 3D data of the measurement object 80 can be reduced. Specifically, when the number of specific measurement points is one, the number of times of causing the robot 60 to stop its motion needs only be one in order to match the position and posture of the robot 60 when the 3D sensor 70 measures 3D data of the measurement object 80 with the position and posture of the robot 60 when the displacement detection device 62 detects the displacements of the joints of the robot 60, and therefore the time needed to perform registration of the 3D data of the measurement object 80 can be reduced.

The registration processing unit 14 registers the 3D data of the measurement object 80 that is measured at a measurement point other than the specific measurement point while the robot 60 is in motion to the 3D data of the measurement object 80 that is measured at the specific measurement point while the robot 60 is stopped, based on the displacements of the joints of the robot 60 at a point in time when the 3D sensor 70 measures 3D data of the measurement object 80 at the specific measurement point while the robot 60 is stopped and the displacements of the joints of the robot 60 at a point in time when the 3D sensor 70 measures 3D data of the measurement object 80 at the measurement point other than the specific measurement point while the robot 60 is in motion.

The registration processing unit 15 registers the 3D data of the measurement object 80 that is measured at a measurement point other than the specific measurement point while the robot 60 is in motion to the 3D data of the measurement object 80 that is measured at the specific measurement point while the robot 60 is stopped such that the registration error between the 3D data of the measurement object 80 that is measured at the measurement point other than the specific measurement point while the robot 60 is in motion and the 3D data of the measurement object 80 that is measured at the specific measurement point while the robot 60 is stopped is less than a threshold value, using an algorithm such as ICP.

The coordinate transformation unit 16 performs the coordinate transformation processing 400 for transforming the 3D data 110-S obtained through the registration processing 300 that is performed by the registration processing units 14 and 15 based on 3D data of the measurement object 80 that are measured at the measurement points other than the specific measurement point and the 3D data of the measurement object 80 that is measured at the specific measurement point, from the coordinate system 203 of the 3D sensor 70 to the coordinate system 201 of the robot 60.

The position/orientation estimation unit 17 estimates the position and orientation of the measurement object 80 relative to the robot 60 based on 3D data 110-R subjected to coordinate-transformation by the coordinate transformation unit 16.

The motion target calculation unit 18 calculates the motion target for the robot 60 to manipulate the measurement object 80 based on the position and orientation of the measurement object 80 relative to the robot 60. The motion target is the target position and the target posture of the robot 60 needed for the robot 60 to manipulate the measurement object 80.

Note that the units (drive control unit 11, sensor control unit 12, synchronization control unit 13, registration processing unit 14, registration processing unit 15, coordinate transformation unit 16, position/orientation estimation unit 17, and motion target calculation unit 18) that have been described above are not necessarily realized by the hardware resources of the computer system 10 working together with the measurement program 31, and may each be realized by using a dedicated hardware resource (e.g., application-specific integrated circuit (ASIC) or field programmable gate array (FPGA)), for example.

Note that the functions of the coordinate transformation unit 16, the position/orientation estimation unit 17, and the motion target calculation unit 18 are not essential, and the computer system 10 may include other functions in accordance with the purpose in place of these functions.

Measurement Method

Figure 6:
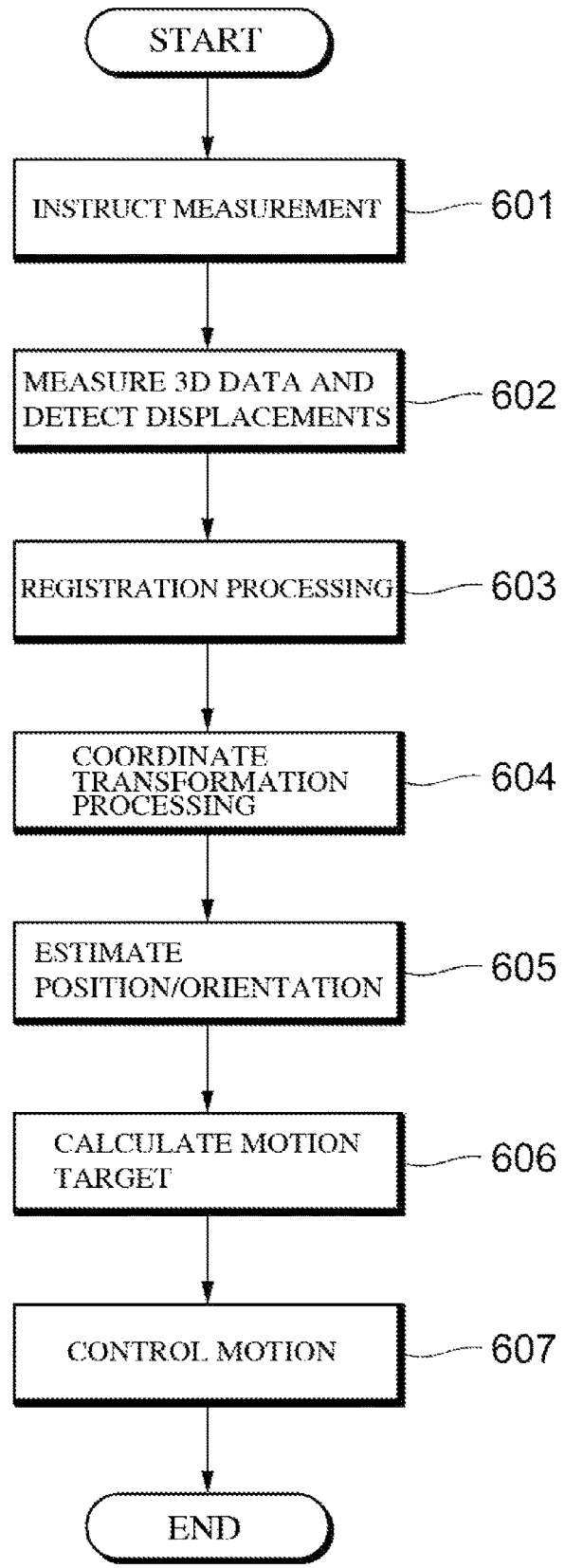
FIG. 6 is a flowchart illustrating a processing flow of a measurement method according to an embodiment or embodiments.

FIG. 6 is a flowchart illustrating an example of a processing flow of the measurement method according to an embodiment or embodiments. This measurement method is processed through execution of the measurement program 31 by the computation device 20.

In step 601, the drive control unit 11 generates a drive instruction for driving the joints of the robot 60 so as to change the positional relationship of the 3D sensor 70 relative to the measurement object 80, and outputs the generated drive instruction to the robot controller 50. The sensor control unit 12 generates, while the robot 60 is in motion or stopped, a measurement instruction for requesting to measure 3D data of the measurement object 80, and outputs the generated measurement instruction to the 3D sensor 70. The measurement instruction of 3D data is output to the 3D sensor 70 while the robot 60 is stopped at the specific measurement point. Also, the measurement instruction of 3D data is output to the 3D sensor 70 while the robot 60 is operating at each measurement point other than the specific measurement point.

In step 602, the 3D sensor 70 measures 3D data of the measurement object 80 in response to the measurement instruction from the sensor control unit 12, and also the displacement detection device 62 detects the displacements of the joints of the robot 60 at a point in time when the 3D data of the measurement object 80 is measured. The 3D data of the measurement object 80 measured by the 3D sensor 70 is transferred to the RAM 23 from the 3D sensor 70 via the input/output interface 40. Similarly, the information indicating the displacements of the joints of the robot 60 detected by the displacement detection device 62 is transferred to the RAM 23 from the displacement detection device 62 via the robot controller 50 and the input/output interface 40.

In step 603, the registration processing unit 14 reads measurement information (information indicating the 3D data of the measurement object 80 and the displacements of the joints of the robot 60) that is stored in the RAM 23, and registers the 3D data of the measurement object 80 that is measured at a measurement point other than the specific measurement point while the robot 60 is in motion to the 3D data of the measurement object 80 that is measured at the specific measurement point while the robot 60 is stopped. The registration processing unit 15 registers the 3D data of the measurement object 80 that is measured at a measurement point other than the specific measurement point while the robot 60 is in motion to the 3D data of the measurement object 80 that is measured at the specific measurement point while the robot 60 is stopped such that the error of registration performed by the registration processing unit 14 is less than the threshold value. The processing in step 603 is the same as the registration processing 300.

In step 604, the coordinate transformation unit 16 transforms the 3D data 110-S obtained through the registration processing in step 603 from the coordinate system 203 of the 3D sensor 70 to the coordinate system 201 of the robot 60. The processing in step 604 is the same as the coordinate transformation processing 400.

In step 605, the position/orientation estimation unit 17 estimates the position and orientation of the measurement object 80 relative to the robot 60 based on the 3D data 110-R that has been subjected to coordinate-transformation in step 604.

In step 606, the motion target calculation unit 18 calculates the motion target (target position and target posture) for the robot 60 to manipulate the measurement object 80 based on the position and orientation of the measurement object 80 that is estimated in step 605.

In step 607, the drive control unit 11 generates a drive instruction for driving the joints of the robot 60 such that the position and posture of the robot 60 matches the target position and the target posture that are calculated in step 606, and outputs the generated drive instruction to the robot controller 50.

Note that the pieces of processing in steps 604 to 607 are not essential for the measurement method according to an embodiment or embodiments, and therefore the measurement method according to an embodiment or embodiments may include another processing in accordance with the measurement purpose of the measurement system 100 in place of these pieces of processing. Also, the order of steps 604 and 605 may be inverted. For example, a configuration may be adopted in which the position and orientation of the measurement object 80 relative to the robot 60 in the sensor coordinate system 203 is estimated, and then the position and orientation of the measurement object 80 relative to the robot 60 is transformed from the sensor coordinate system 203 to the robot coordinate system 201.

There are a software method to be executed by the computer system 10 and a hardware method to be executed by the robot controller 50 for matching the position and posture of the robot 60 when the 3D sensor 70 measures 3D data of the measurement object 80 with the position and posture of the robot 60 when the displacement detection device 62 detects the displacements of the joints of the robot 60 at the specific measurement point.

With the software method, the computer system 10 receives information indicating the displacements of the joints of the robot 60 from the displacement detection device 62 via the robot controller 50 by transmitting, to the robot controller 50, a command for requesting the robot controller 50 to transfer the information indicating the displacements of the joints of the robot 60, and at the same time, the computer system 10 acquires 3D data of the measurement object 80 from the 3D sensor 70 by instructing the 3D sensor 70 to measure the 3D data of the measurement object 80, for example.

With the hardware method, the robot controller 50 acquires information indicating the displacements of the joints of the robot 60 from the displacement detection device 62, and at the same time, instructs the 3D sensor 70 to measure the 3D data of the measurement object 80, for example. The information indicating the displacements of the joints of the robot 60 is transferred from the robot controller 50 to the computer system 10, and the 3D data of the measurement object 80 is transferred from the 3D sensor 70 to the computer system 10.

Note that the robot 60 is not limited to an industrial robot to be used for factory automation, and may be a robot (e.g., operating robot, medical robot, cleaning robot, rescue robot, security robot) to be used in a service industry.

Some of or all of the embodiment described above can be described as in the following notes, but there is no limitation thereto.

Note 1

A measurement system 100 including:

a 3D sensor 70 that is to be installed in a robot 60, and is configured to measure 3D data indicating three-dimensional coordinates of points on the surface of a measurement object 80;

a displacement detection device 62 configured to detect displacements of joints of the robot 60;

a drive device 61 configured to drive the joints of the robot 60 so as to change positional relationship of the 3D sensor 70 relative to the measurement object 80;

a sensor control unit 12 configured to control the 3D sensor 70 so as to measure 3D data of the measurement object 80 at a plurality of measurement points 90-1, 90-2, ..., and 90-N at which positional relationships of the 3D sensor 70 relative to the measurement object 80 are different;

a synchronization control unit 13 configured to match the position and posture of the robot 60 when the 3D sensor 70 measures 3D data of the measurement object 80 with the position and posture of the robot 60 when the displacement detection device 62 detects displacements of the joints of the robot 60, by causing the robot 60 to stop its motion at one specific measurement point of the plurality of measurement points 90-1, 90-2, ..., and 90-N;

a first registration processing unit 14 configured to register the 3D data of the measurement object 80 that is measured at a measurement point other than the specific measurement point while the robot 60 is in motion to the 3D data of the measurement object 80 that is measured at the specific measurement point while the robot 60 is stopped, based on the displacements of the joints of the robot 60 at a point in time when the 3D sensor 70 measures the 3D data of the measurement object 80 at the specific measurement point while the robot 60 is stopped and the displacements of the joints of the robot 60 at a point in time when the 3D sensor 70 measures the 3D data of the measurement object 80 at the measurement point other than the specific measurement point while the robot 60 is in motion; and a second registration processing unit 15 configured to register the 3D data of the measurement object 80 that is measured at a measurement point other than the specific measurement point while the robot 60 is in motion to the 3D data of the measurement object 80 that is measured at the specific measurement point while the robot 60 is stopped such that a registration error between the 3D data of the measurement object 80 that is measured at the measurement point other than the specific measurement point while the robot 60 is in motion and the 3D data of the measurement object 80 that is measured at the specific measurement point while the robot 60 is stopped is less than a threshold value.

Note 2

The measurement system 100 according to Note 1, wherein the timing at which the 3D sensor 70 measures 3D data of the measurement object 80 at at least one measurement point other than the specific measurement point is not synchronized with the timing at which the displacement detection device 62 detects displacements of the joints of the robot 60.

Note 3

The measurement system 100 according to Note 1 or 2, wherein the number of times the synchronization control unit 13 causes the robot 60 to stop its motion is less than the number of the plurality of measurement points 90-1, 90-2, ..., and 90-N.

Note 4

The measurement system 100 according to any one of Notes 1 to 3, wherein the specific measurement point is any one measurement point of the plurality of measurement points 90-1, 90-2, ..., and 90-N.

Note 5

The measurement system 100 according to any one of Notes 1 to 4, further including:

a coordinate transformation unit 16 configured to transform 3D data from a coordinate system of the 3D sensor 70 to a coordinate system of the robot 60, the 3D data being obtained by registration between the 3D data of the measurement object 80 that is measured at each measurement point other than the specific measurement point and the 3D data of the measurement object 80 that is measured at the specific measurement point, which is performed by the first registration processing unit 14 and the second registration processing unit 15; and a position/orientation estimation unit 17 configured to estimate the position and orientation of the measurement object 80 relative to the robot 60 based on 3D data subjected to coordinate-transformation by the coordinate transformation unit 16.

Note 6

A measurement device 200 that receives information indicating displacements that is output from a displacement detection device 62 configured to detect displacements of joints of a robot 60, and outputs a drive instruction to a drive device 61 configured to drive the joints of the robot 60, the measurement device 200 comprising:

a 3D sensor 70 that is to be installed in the robot 60, and is configured to measure 3D data indicating three-dimensional coordinates of points on the surface of a measurement object 80;

a drive control unit 11 configured to generate a drive instruction for driving the joints of the robot 60 so as to change positional relationship of the 3D sensor 70 relative to the measurement object 80;

a sensor control unit 12 configured to control the 3D sensor 70 so as to measure 3D data of the measurement object 80 at a plurality of measurement points 90-1, 90-2, ..., and 90-N at which positional relationships of the 3D sensor 70 relative to the measurement object 80 are different;

a synchronization control unit 13 configured to match the position and posture of the robot 60 when the 3D sensor 70 measures 3D data of the measurement object 80 with the position and posture of the robot 60 when the displacement detection device 62 detects displacements of the joints of the robot 60, by causing the robot 60 to stop its motion at one specific measurement point of the plurality of measurement points 90-1, 90-2, ..., and 90-N;

first registration processing unit 14 configured to register the 3D data of the measurement object 80 that is measured at a measurement point other than the specific measurement point while the robot 60 is in motion to the 3D data of the measurement object 80 that is measured at the specific measurement point while the robot 60 is stopped, based on the displacements of the joints of the robot 60 at a point in time when the 3D sensor 70 measures the 3D data of the measurement object 80 at the specific measurement point while the robot 60 is stopped and the displacements of the joints of the robot 60 at a point in time when the 3D sensor 70 measures the 3D data of the measurement object 80 at the measurement point other than the specific measurement point while the robot 60 is in motion; and a second registration processing unit 15 configured to register the 3D data of the measurement object 80 that is measured at a measurement point other than the specific measurement point while the robot 60 is in motion to the 3D data of the measurement object 80 that is measured at the specific measurement point while the robot 60 is stopped such that a registration error between the 3D data of the measurement object 80 that is measured at the measurement point other than the specific measurement point while the robot 60 is in motion and the 3D data of the measurement object 80 that is measured at the specific measurement point while the robot 60 is stopped is less than a threshold value.

Note 7

A measurement method, when executed, for causing a measurement device 200 that includes a 3D sensor 70 that is to be installed in a robot 60 and is configured to measure 3D data indicating three-dimensional coordinates of points on the surface of a measurement object 80, receives information indicating displacements that is output from a displacement detection device 62 configured to detect displacements of joints of the robot 60, and outputs a drive instruction to a drive device 61 configured to drive the joints of the robot 60 to execute:

generating a drive instruction for driving the joints of the robot 60 so as to change positional relationship of the 3D sensor 70 relative to the measurement object 80;

controlling the 3D sensor 70 so as to measure 3D data of the measurement object 80 at a plurality of measurement points 90-1, 90-2, . . . , and 90-N at which positional relationships of the 3D sensor 70 relative to the measurement object 80 are different;

matching the position and posture of the robot 60 when the 3D sensor 70 measures 3D data of the measurement object 80 with the position and posture of the robot 60 when the displacement detection device 62 detects displacements of the joints of the robot 60, by causing the robot 60 to stop its motion at one specific measurement point of the plurality of measurement points 90-1, 90-2, . . . , and 90-N;

registering the 3D data of the measurement object 80 that is measured at a measurement point other than the specific measurement point while the robot 60 is in motion to the 3D data of the measurement object 80 that is measured at the specific measurement point while the robot 60 is stopped, based on the displacements of the joints of the robot 60 at a point in time when the 3D sensor 70 measures the 3D data of the measurement object 80 at the specific measurement point while the robot 60 is stopped and the displacements of the joints of the robot 60 at a point in time when the 3D sensor 70 measures the 3D data of the measurement object 80 at the measurement point other than the specific measurement point while the robot 60 is in motion; and registering the 3D data of the measurement object 80 that is measured at a measurement point other than the specific measurement point while the robot 60 is in motion to the 3D data of the measurement object 80 that is measured at the specific measurement point while the robot 60 is stopped such that a registration error between the 3D data of the measurement object 80 that is measured at the measurement point other than the specific measurement point while the robot 60 is in motion and the 3D data of the measurement object 80 that is measured at the specific measurement point while the robot 60 is stopped is less than a threshold value.

Note 8

A measurement program 31, when executed, for causing a measurement device 200 that includes a 3D sensor 70 that is to be installed in a robot 60 and is configured to measure 3D data indicating three-dimensional coordinates of points on the surface of a measurement object 80, receives information indicating displacements that is output from a displacement detection device 62 configured to detect displacements of joints of the robot 60, and outputs a drive instruction to a drive device 61 configured to drive the joints of the robot 60 to execute:

generating a drive instruction for driving the joints of the robot 60 so as to change positional relationship of the 3D sensor 70 relative to the measurement object 80;

controlling the 3D sensor 70 so as to measure 3D data of the measurement object 80 at a plurality of measurement points 90-1, 90-2, . . . , and 90-N at which positional relationships of the 3D sensor 70 relative to the measurement object 80 are different;

matching the position and posture of the robot 60 when the 3D sensor 70 measures 3D data of the measurement object 80 with the position and posture of the robot 60 when the displacement detection device 62 detects displacements of the joints of the robot 60, by causing the robot 60 to stop its motion at one specific measurement point of the plurality of measurement points 90-1, 90-2, . . . , and 90-N;

registering the 3D data of the measurement object 80 that is measured at a measurement point other than the specific measurement point while the robot 60 is in motion to the 3D data of the measurement object 80 that is measured at the specific measurement point while the robot 60 is stopped, based on the displacements of the joints of the robot 60 at a point in time when the 3D sensor 70 measures the 3D data of the measurement object 80 at the specific measurement point while the robot 60 is stopped and the displacements of the joints of the robot 60 at a point in time when the 3D sensor 70 measures the 3D data of the measurement object 80 at the measurement point other than the specific measurement point while the robot 60 is in motion; and registering the 3D data of the measurement object 80 that is measured at a measurement point other than the specific measurement point while the robot 60 is in motion to the 3D data of the measurement object 80 that is measured at the specific measurement point while the robot 60 is stopped such that a registration error between the 3D data of the measurement object 80 that is measured at the measurement point other than the specific measurement point while the robot 60 is in motion and the 3D data of the measurement object 80 that is measured at the specific measurement point while the robot 60 is stopped is less than a threshold value.

10 Computer system
20 Computation device
21 CPU
22 ROM
23 RAM
30 Storage device
31 Measurement program
40 Input/output interface
50 Robot controller
60 Robot
61 Drive device
62 Displacement detection device
70 3D sensor
80 Measurement object
100 Measurement system
200 Measurement device

The invention claimed is:

1. A measurement system comprising:
   a 3D sensor capable of being installed in a robot, and configured to measure 3D data indicating three-dimensional coordinates of points on the surface of a measurement object;

a displacement detection device configured to detect displacements of joints of the robot;

a drive device configured to drive the joints of the robot so as to change positional relationship of the 3D sensor relative to the measurement object;

a sensor control unit configured to control the 3D sensor so as to measure 3D data of the measurement object at a plurality of measurement points at which positional relationships of the 3D sensor relative to the measurement object are different;

a synchronization control unit configured to match the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points;

a first registration processing unit configured to register the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and a second registration processing unit configured to register the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value.

2. The measurement system according to claim 1, wherein the timing at which the 3D sensor measures 3D data of the measurement object at at least one measurement point other than the specific measurement point is not synchronized with the timing at which the displacement detection device detects displacements of the joints of the robot.

3. The measurement system according to claim 1, wherein the number of times the synchronization control unit causes the robot to stop its motion is less than the number of the plurality of measurement points.

4. The measurement system according to claim 1, wherein the specific measurement point is any one measurement point of the plurality of measurement points.

5. The measurement system according to claim 1, further comprising:

a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and a position/orientation estimation unit configured to estimate the position and orientation of the measurement object relative to the robot based on 3D data subjected to coordinate-transformation by the coordinate transformation unit.

6. The measurement system according to claim 2, wherein the number of times the synchronization control unit causes the robot to stop its motion is less than the number of the plurality of measurement points.

7. The measurement system according to claim 2, wherein the specific measurement point is any one measurement point of the plurality of measurement points.

8. The measurement system according to claim 2, further comprising:

a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and a position/orientation estimation unit configured to estimate the position and orientation of the measurement object relative to the robot based on 3D data subjected to coordinate-transformation by the coordinate transformation unit.

9. The measurement system according to claim 3, wherein the specific measurement point is any one measurement point of the plurality of measurement points.

10. The measurement system according to claim 3, further comprising:

a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and a position/orientation estimation unit configured to estimate the position and orientation of the measurement object relative to the robot based on 3D data subjected to coordinate-transformation by the coordinate transformation unit.

11. The measurement system according to claim 4, further comprising:

a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and a position/orientation estimation unit configured to estimate the position and orientation of the measurement object relative to the robot based on 3D data subjected to coordinate-transformation by the coordinate transformation unit.

12. The measurement system according to claim 6, wherein the specific measurement point is any one measurement point of the plurality of measurement points.

13. The measurement system according to claim 6, further comprising:
a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and
a position/orientation estimation unit configured to estimate the position and orientation of the measurement object relative to the robot based on 3D data subjected to coordinate-transformation by the coordinate transformation unit.

14. The measurement system according to claim 7, further comprising:
a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and
a position/orientation estimation unit configured to estimate the position and orientation of the measurement object relative to the robot based on 3D data subjected to coordinate-transformation by the coordinate transformation unit.

15. The measurement system according to claim 9, further comprising:
a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and
a position/orientation estimation unit configured to estimate the position and orientation of the measurement object relative to the robot based on 3D data subjected to coordinate-transformation by the coordinate transformation unit.

16. The measurement system according to claim 12, further comprising:
a coordinate transformation unit configured to transform 3D data from a coordinate system of the 3D sensor to a coordinate system of the robot, the 3D data being obtained by registration between the 3D data of the measurement object that is measured at each measurement point other than the specific measurement point and the 3D data of the measurement object that is measured at the specific measurement point, which is performed by the first registration processing unit and the second registration processing unit; and
a position/orientation estimation unit configured to estimate the position and orientation of the measurement object relative to the robot based on 3D data subjected to coordinate-transformation by the coordinate transformation unit.

17. A measurement device that receives information indicating displacements that is output from a displacement detection device configured to detect displacements of joints of a robot, and outputs a drive instruction to a drive device configured to drive the joints of the robot, the measurement device comprising:
a 3D sensor capable of being installed in the robot, and configured to measure 3D data indicating three-dimensional coordinates of points on the surface of a measurement object;
a drive control unit configured to generate a drive instruction for driving the joints of the robot so as to change positional relationship of the 3D sensor relative to the measurement object;
a sensor control unit configured to control the 3D sensor so as to measure 3D data of the measurement object at a plurality of measurement points at which positional relationships of the 3D sensor relative to the measurement object are different;
a synchronization control unit configured to match the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points;
a first registration processing unit configured to register the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and
a second registration processing unit configured to register the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value.

18. A measurement method, when executed, for causing a measurement device that comprises a 3D sensor capable of being installed in a robot and configured to measure 3D data indicating three-dimensional coordinates of points on the surface of a measurement object, receives information indicating displacements that is output from a displacement detection device configured to detect displacements of joints of the robot, and outputs a drive instruction to a drive device configured to drive the joints of the robot to execute:

generating a drive instruction for driving the joints of the robot so as to change positional relationship of the 3D sensor relative to the measurement object;

controlling the 3D sensor so as to measure 3D data of the measurement object at a plurality of measurement points at which positional relationships of the 3D sensor relative to the measurement object are different;

matching the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points;

registering the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and registering the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value.

19. A non-transitory computer-readable storage medium storing a measurement program, when read and executed by a central processing unit, for causing a measurement device that comprises a 3D sensor capable of being installed in a robot, and configured to measure 3D data indicating three-dimensional coordinates of points on the surface of a measurement object, receives information indicating displacements that is output from a displacement detection device configured to detect displacements of joints of the robot, and outputs a drive instruction to a drive device configured to drive the joints of the robot to perform operations comprising:

generating a drive instruction for driving the joints of the robot so as to change positional relationship of the 3D sensor relative to the measurement object;

controlling the 3D sensor so as to measure 3D data of the measurement object at a plurality of measurement points at which positional relationships of the 3D sensor relative to the measurement object are different;

matching the position and posture of the robot when the 3D sensor measures 3D data of the measurement object with the position and posture of the robot when the displacement detection device detects displacements of the joints of the robot, by causing the robot to stop its motion at one specific measurement point of the plurality of measurement points;

registering the 3D data of the measurement object that is measured at a measurement point other than the specific measurement point while the robot is in motion to the 3D data of the measurement object that is measured at the specific measurement point while the robot is stopped, based on the displacements of the joints of the robot at a point in time when the 3D sensor measures the 3D data of the measurement object at the specific measurement point while the robot is stopped and the displacements of the joints of the robot at a point in time when the 3D sensor measures the 3D data of the measurement object at the measurement point other than the specific measurement point while the robot is in motion; and registering the 3D data of the measurement object that is measured at a measurement point other than the specific measurement point while the robot is in motion to the 3D data of the measurement object that is measured at the specific measurement point while the robot is stopped such that a registration error between the 3D data of the measurement object that is measured at the measurement point other than the specific measurement point while the robot is in motion and the 3D data of the measurement object that is measured at the specific measurement point while the robot is stopped is less than a threshold value.

\* \* \* \* \*